(No Model.) 4 Sheets—Sheet 3.
H. O. THOMAS.
HAND TRUCK.
No. 528,747. Patented Nov. 6, 1894.
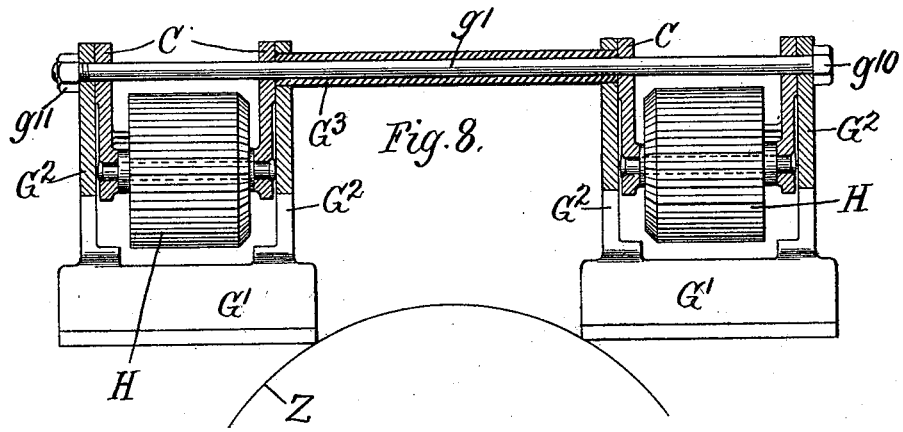
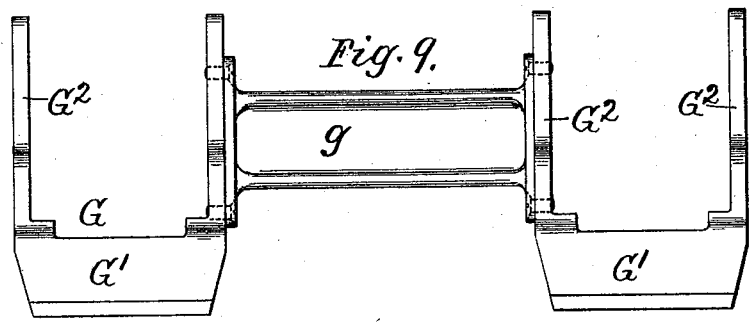
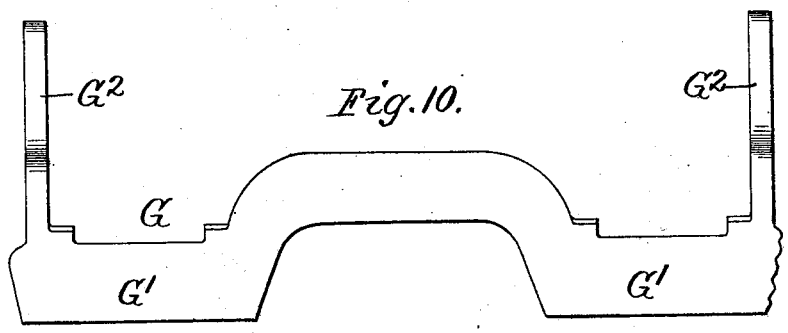
Witnesses.
E. T. Wray.
Jean Elliott.
Inventor.
Henry O. Thomas
by Burton and Burton
his attys.

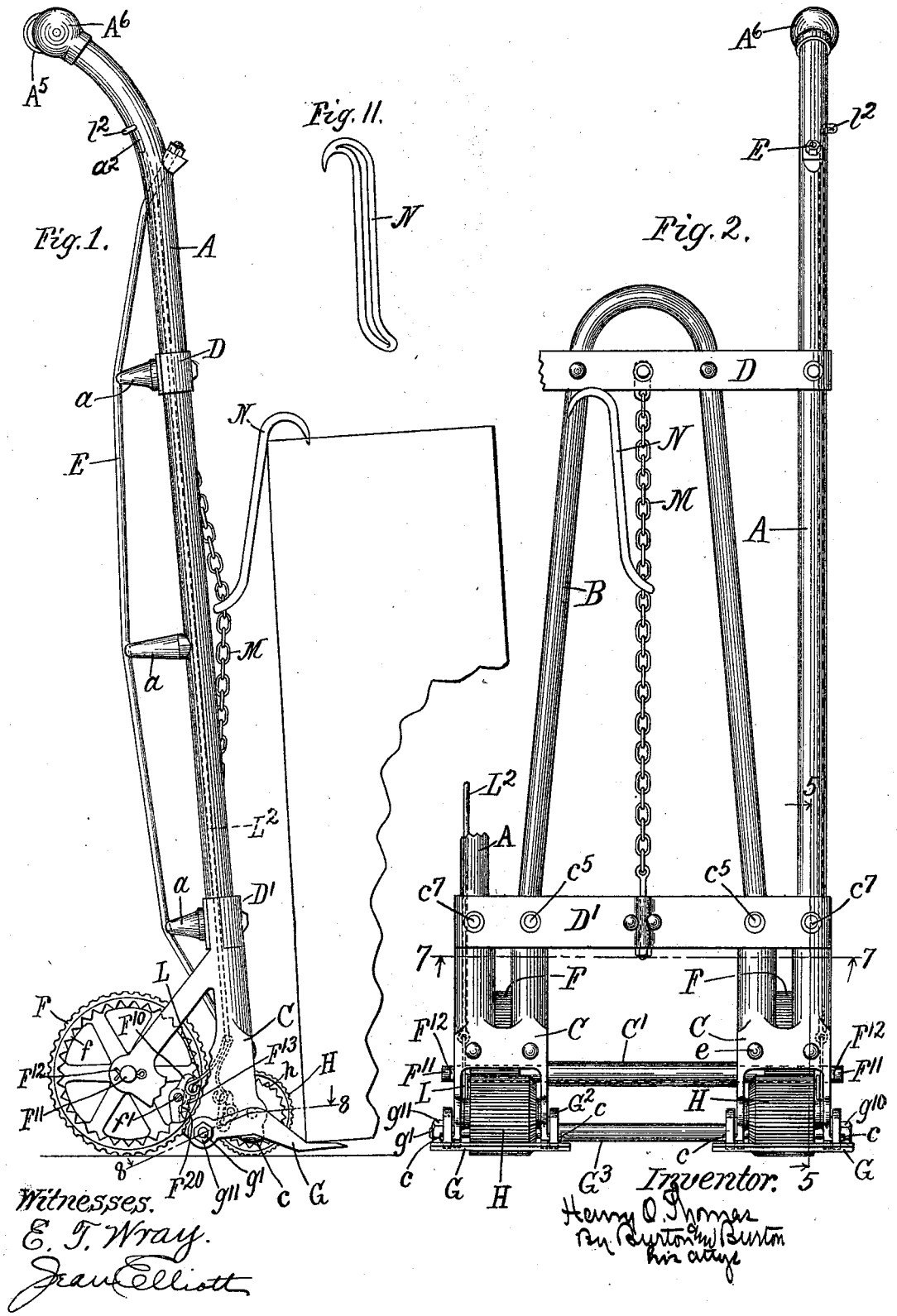

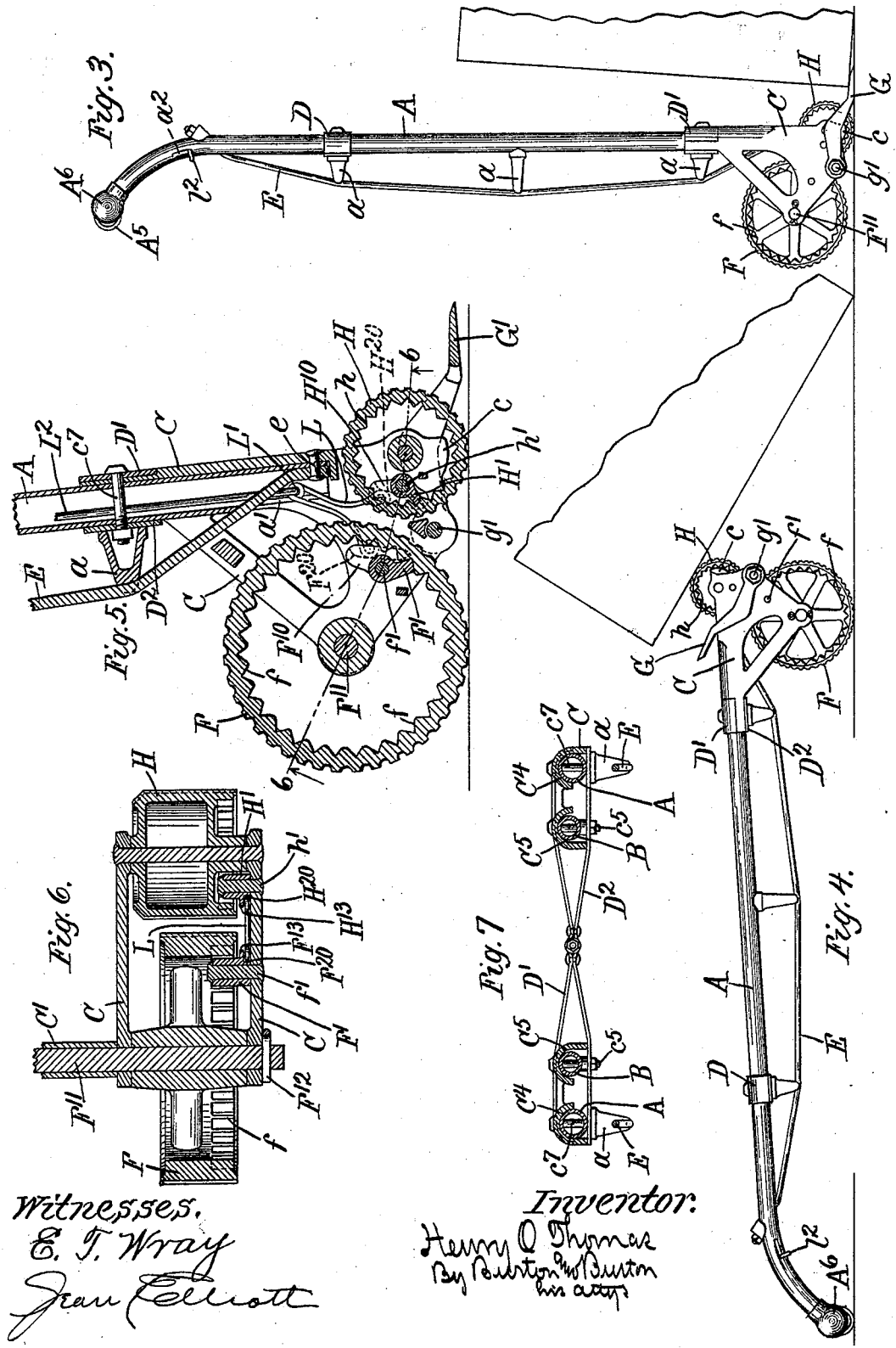

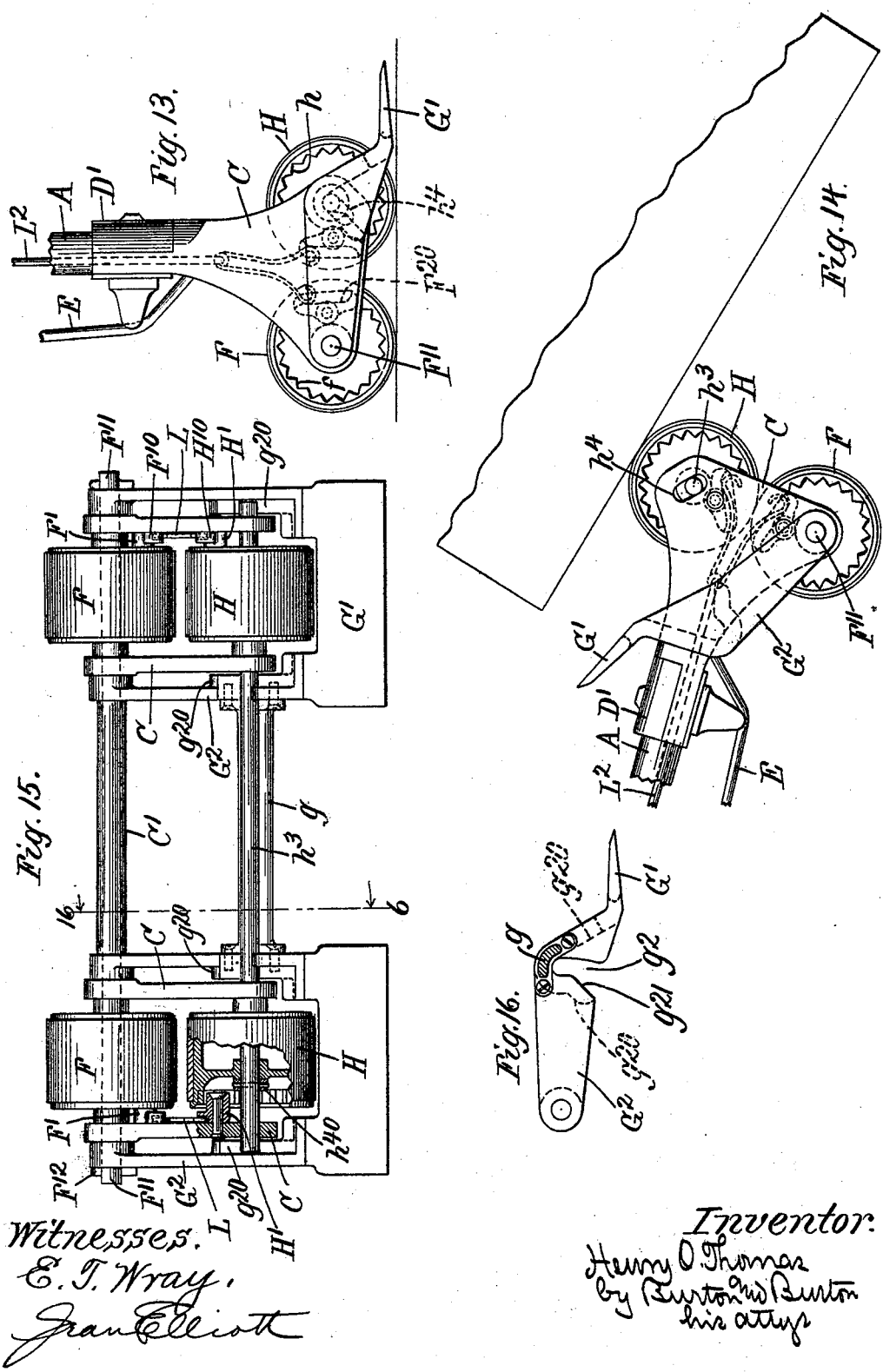

UNITED STATES PATENT OFFICE.

HENRY O. THOMAS, OF KIMBALL, NEBRASKA.

HAND-TRUCK.

SPECIFICATION forming part of Letters Patent No. 528,747, dated November 6, 1894.

Application filed January 12, 1894. Serial No. 496,594. (No model.)

*To all whom it may concern:*

Be it known that I, HENRY O. THOMAS, a citizen of the United States, residing at Kimball, county of Kimball, and State of Nebraska, have invented certain new and useful Improvements in Hand-Trucks, which are fully set forth in the following specification, reference being had to the accompanying drawings, forming a part thereof.

This invention relates to trucks designed to be operated by hand in loading, unloading and transferring merchandise and heavy articles, and is an improvement in details of construction and some general features upon an invention in the same class, for which Patent No. 509,054 was granted to me, dated November 21, 1893, and for which my application for re-issue is now pending.

The improvements comprise a modification by which the loading wheels and carrying wheels may be brought into engagement or peripheral contact during the process of loading and details of construction of the frame for strength and a specific form and arrangement of the pawls and their operating spring which adapts both pawls to be thrown into and out of engagment by one movement of the operator.

It comprises also a modification in the arrangement of the pivoted shoe or shoes by which the load is first engaged, which adapts such shoes to serve as a fulcrum over which the load may be tilted back onto the truck and off the loading wheels.

In the drawings,—Figure 1 is a side elevation of my improved truck, being shown in a position which it normally occupies when not in use,—that is, substantially upright, resting on all the wheels, but having represented in partial outline a load lodged upon its shoes in the position which might be occupied just prior to or in the act of unloading. Fig. 2 is a front elevation of the truck without the load, one handle being broken away. Fig. 3 is a side elevation showing the truck in the act of engaging the load. Fig. 4 shows the truck brought to horizontal position after engaging the load with the lips, showing the load as it would rest upon the loading wheels at that stage of the loading process. Fig. 5 is a detail section at the line 5—5 on Fig. 2. Fig. 6 is a section at the line 6—6 on Fig. 5. Fig. 7 is a detail section at the line 7—7 on Fig. 2. Fig. 8 is a section at the line 8—8 on Fig. 1. Fig. 9 is a plan of the shoes slightly modified from the form shown in former views by the addition of a brace binding the shoes rigidly together. Fig. 10 is a plan of a further modification in which the shoes are integral. Fig. 11 is a perspective of the grapple-hook or claw shown in the principal figure. Fig. 12 is a detail showing a form of grapple hook and connection different from that shown in Figs. 1 and 2 section being made through the hook and the fastenings of the rod in which it is held in a plane axial with respect to the rod. Fig. 13 is a detail side elevation of the lower forward end of the truck, showing a modification of the bearings and arrangement of the loading wheel or wheels adapted to permit them to come into peripheral engagement with the supporting wheels when the load is upon them. Fig. 14 shows the same device in the position under the load. Fig. 15 is a bottom or inverted plan of the truck of this modified form. Fig. 16 is a detail section at the line 16—16 on Fig. 15.

In the further description of my improved truck I will describe the structure and operation without regard to the fact that the general features have already been described in my former patent above-mentioned, so that it may be fully understood from this description alone without reference to said former patent.

The truck frame comprises the handles or side-bars A A, an intermediate bow or brace B, the wheel-bearing castings or forgings C C at the lower or forward end, cross-ties D and D' toward the upper and lower ends respectively, straining rods E E, by which the side-bars A A are stiffened or trussed through the co-operation of such straining rods with the struts or posts *a a a a* in a manner too familiar to need further explanation. For the side-bars and the bow, seats or sockets are provided in the upper ends of the wheel-bearing brackets C C. Both the side-bars and the bow, but especially the side-bars, are made tubular, both for lightness, and, in respect to the side-bars, for the further purpose of accommodating certain pawl-operating rods hereinafter described.

F F are the supporting wheels. They are journaled in the wheel-bearing brackets C C respectively on a common shaft $F^{11}$, which extends through both the brackets spanning the width of the truck and constituting a connection between the two wheel-bearing brackets, through each of which it passes upon both sides of the wheel in each bracket, cotter-pins $F^{12}$ $F^{12}$ at the ends serving to retain it in place, and the sleeve C' on the shaft between the two brackets C C, and abutting at its ends against their inner sides respectively, serving as a stop on the shaft to hold the braces positively apart.

G G are the shoes. They may be either independent as shown in Fig. 8, or rigidly connected by the brace or cross-tie $g$, as shown in Fig. 9, or integral, and virtually only one, as shown in Fig. 10. Each of these shoes, however, whether they are rigid or independent, and whether there be two shoes or only one, comprises the lip G' and the side arms $G^2$ $G^2$, which extend back from the lip, embracing between them the bracket C (or both said brackets when the form is that shown in Fig. 10), and being pivoted at their rear ends to the brackets. In the form shown in the principal figures, the shoes are pivoted to the brackets upon the rod $g'$, which extends through both the brackets and both arms of both the shoes, reaching therefore from side to side of the truck and retained in place by a head and bolt $g^{10}$ and $g^{11}$ at the ends, respectively of the rod. On this rod is a sleeve $G^3$, which extends between the proximate sides of the wheel-bearing brackets C' C', and by its ends stops the brackets longitudinally on the rod, holding both shoes and brackets a proper distance apart or assisting in so doing if the shoes are connected by the brace $g$. This description relates to the form shown in all the figures, except Figs. 13 to 16 inclusive. The modifications shown in these figures will be hereinafter described.

H H are the loading or supporting wheels. In the principal form shown, these wheels are journaled independently in the wheel-supporting brackets C C in front of or above the supporting wheels F F. Their relative position with respect to the supporting wheels in the brackets respectively is seen in Fig. 6, and in the several side views of the truck.

The peripheries of both the truck-supporting wheels and loading wheels may be corrugated or roughened in any desirable manner to increase their traction power.

The position of the supporting and loading wheels relative to the truck as a whole is such as they are all adapted to constitute supporting wheels for the truck when the latter is in upright position, as seen in Fig. 1; that is, the center of gravity of the truck as a whole, without any load upon it, is in vertical line between the lines of floor contact of all the wheels, so that the truck rests stably upon all the wheels and may be moved about freely and without danger of falling without resting upon them all, and is thereby adapted to be pushed aside when out of use and occupy the least possible space in storage, and occasion the least possible inconvenience by its presence in a ware-house when not in use. The shoes G' G' being pivoted to the wheel-supporting brackets tend to fall into position approximately at right angles to the general direction of the frame and handles of the truck, when the truck is upright as in Fig. 1. A boss $c$ is provided on the frame which arrests the shoes at the position shown in Fig. 1, so that when the truck stands on all the wheels the shoes are off the floor, so that they do not interfere with the free handling of the truck, as described. When the operator desires to engage the shoes under a load to be lifted onto the truck, the truck being seized by the handles and pushed forward, will naturally be lifted from the position shown in Fig. 3, the carrying or supporting wheels being lifted off the floor and the weight being thrown wholly upon the loading wheels, which, for the time being, become the supporting wheels; and in this position, the truck can be pushed rapidly forward, the shoes resting on the floor, and by reason of their free connection to the truck being adapted to follow any inequalities in the floor, keeping the points down to the floor, so that they will enter under the edge of the box or load resting on the floor. The momentum of the truck pushed rapidly in this manner serves to drive the edges of the shoes under the load, and that is accomplished easily, because the operator is not obliged, while pushing the truck forward thus, to take any special pains in order to keep the points of the shoes on the floor, but can apply whatever force is necessary to obtain the desired speed and momentum, the whole weight being on the wheels and not on the points of the shoes, though the latter are upon the floor. The shoes being thus engaged under the load, the truck will be tilted back, the weight coming again on the supporting wheels, and as the handles are further depressed, the loading wheels are lifted off of the floor, the load engaged by the shoes is lifted up at the side thus engaged and rests on the points of the shoes. If the truck is now pushed under the load, the shoes will rock rearward, letting the load down onto the loading wheels, and the shoes being free, will fall back toward the truck frame, the position being as shown in Fig. 4. If the load is not too heavy, and is in such position that it will not too easily slide at the end which rests on the floor, the truck may be now pushed under the load, the loading wheels serving as anti-friction rollers in contact with the load, while the supporting wheels perform like function on the floor, or so far advanced that it may be easily tilted onto the truck over the loading wheels as the fulcrum, and pushed up on them as on anti-friction rollers, as far as desired. Preferably, the shoes are stopped in their backward fall against the wheel-supporting brackets, as seen in Fig. 4, with their points in such position with respect to the upper face of the truck frame and the upper peripheries of the loading wheels, that the load, when pushed up on the truck so far as to be overbalanced on the loading wheels, will rest upon the points of the shoes before it strikes the truck frame at a point farther up, and upon being pushed a little farther up on the truck, will fulcrum on the points of the shoes and being overbalanced upon them, rest at the upper end on the truck. The points of the shoes thus tend to act as detent pawls to prevent the load sliding down.

Thus far, the action is that which would occur if all the wheels, both supporting wheels and loading wheels, were free to revolve in either direction on their axles or in their bearings; but the efficiency of this device is very much increased by the pawl and ratchet devices pertaining to these wheels which will now be described. At the outer side of each of the wheels, both supporting wheels and loading wheels, the rim or felly is interiorly ratchet toothed. These ratchet teeth are shown at $f$ on the supporting wheels and at $h$ on the loading wheels. To the inner side of the outer arm or bar of each of the wheel-supporting brackets are pawls F′ and H′, respectively, which are overhung by the ratcheted rims or flanges of the wheels F and H, and are adapted to engage with the ratchet teeth, as seen most clearly in Fig. 5. Fig. 6 shows how these pawls are pivoted on studs $f'$ and $h'$, respectively, rooted in the brackets C C. The engagement of the pawls with the ratchets is such as to permit the supporting wheels to rotate in the direction required by the forward movement of the truck when it is supported on these wheels, and to permit the wheels or rollers H to revolve in the direction required by their engagement with the load resting upon them when the truck is in like manner advanced under the load, or to permit the truck to be pushed forward when it is inverted, as it may be, and is supported on these loading wheels. The ratchets prevent the rotation of the wheels respectively in the opposite direction. The wheels thus have opposite rotary motion, or such motion as they would have relatively if they were peripherally engaged with each other at their proximate sides. In order to hold the pawls thus in engagement with the ratchets of the wheels respectively, when this mode of operation is desired, and also to permit them to be thrown out of engagement when it is not desired, the pawls are provided with tails or rearward extensions, $F^{10}$ and $H^{10}$, respectively, which stand outside the planes of the outer peripheral margins of the wheels, respectively, that is, out of range of the ratchet rims, and the bodies of the pawls proper are also extended laterally outside the same planes to the inner side of the arm or side-bar of the bracket C, to which the pawls are pivoted. I provide spring L upon each side of the truck which consists of a spring wire or rod coiled to form an eye at its middle, and extending from the eye in two branches, one of which bears against the pawl F′, and the other against the pawl H′ on the shoulders or ledges which project outside the wheels respectively. These shoulders or ledges $F^{10}$ and $H^{10}$, respectively, extend as described the whole length of the pawls, both as to the operating nose or body and as to the tail constituting seats on which the ends of the spring L may bear or slide. The eye of the spring stands within the lower end of the tubular handle or side-bar A of the frame, which, at the lower end is cut away at one side, as seen at $a'$ to permit the spring to move longitudinally with its eye in the pipe and its arm extending out downward and not directly out at the end of the pipe, as clearly seen in Fig. 5. To the eye L′ of the spring, a rod $L^2$ is connected, which extends up through the tubular side-bar A to a point conveniently near the handle end where it is provided with a bend or offset $l^2$, which projects through a slot $a^2$ in the side-bar, as seen in Fig. 1. When the offset $l^2$ is at the upper end of the slot $a^2$, the spring ends rest upon the tails of the pawls and hold the operating ends of the pawls in engagement with the ratchets. If the rod be pushed down until the offsets are at the lower end of the slot, the lower portions of the springs pass by the line of the pivots of the pawls and rest upon the inner face of their operating ends, forcing the pawls out from engagement with the ratchets. When the pawls are in engagement, as shown in full lines in Fig. 5, the truck having been gotten under the load in the manner described and to the extent shown in Fig. 4, the movement by which the handles were depressed to that position, causes the supporting wheels F to roll on the floor under the load, the loading wheels being prevented by their pawls from rotating in a direction which would permit them to roll out from under the load, and they have, therefore, in that action constituted the fulcrum at their point of contact with the load, for the action of a lever, the longer arm of which is the distance from that point of bearing of the loading wheels against the load to the handle end of the truck, and the shorter arm the distance from the same bearing point to the floor contact of the supporting wheels F. If the motion is reversed, the handles being lifted, the fulcrum shifts to the bearing of the supporting wheels resting on the floor, and the loading wheels will roll under the load in contact with its under surface. The depression of the handles again shifts the fulcrum back to the most advanced point reached by the loading wheels, and the supporting wheels are further advanced on the floor under the load; and this pump-handle movement being continued, the truck is easily entered under the load to a point at which the load is overbalanced rearward on the loading wheels, and may be tilted easily back onto the truck, or, more accurately speaking, onto the points of the shoes, and being nearly balanced on the loading wheels can be easily handled and pushed rearward on them as on the rollers until the points of the shoes become a fulcrum on which the load will be overbalanced rearward and dropped at its rearward or upper end onto the truck. In order to keep the pawl springs from accidentally sliding over and becoming entangled in the wheels, the pawls are provided with guard flanges $F^{13}$ and $H^{13}$, respectively, between the spring ends and the wheels, so that the springs operate in paths which are guarded upon one side by the inner faces of the outer arms of the brackets C, and on the other side by the flanges on the pawls.

In the ordinary use of the truck after it is loaded, in order that it may be wheeled in either direction and turned readily upon its wheels, the pawls will be set out of engagement with the ratchets.

When the two shoes are made independent, they accommodate themselves independently to the floor in the movement in which the momentum of the truck is utilized to drive the shoes under the load to effect the first engagement, and in this respect there is a slight advantage in having the shoes independent of each other; but this feaure is of less consequence than that the forward edge or lip is not continuous across the whole width of the truck, whether the shoes be independent or not; but in any form there is an interval at the middle part, or interruption in the lip, making a recess, one advantage of which is that such loads as barrels and casks can be picked up without driving the lips under the edge or chine of the barrel, if it is standing on end, but merely by running the truck up against the side of the barrel, so that the latter lodges in the interval between the two lips or interrupted lip, and is engaged on its curved sides by the corners, as indicated by the curved line Z on Fig. 8, and the usual swell of the barrel or cask from the heads toward the center will prevent the barrel, when thus engaged by the corners of the lips, from slipping, especially if there are hoops or other protuberances on the surface. The form shown in Fig. 9, in which the two shoes are made rigid by a cross-brace, is not essentially different in its adaptation for engaging barrels and casks, but the beveling off of the inner corners of the lips of the shoes adapts this form to receive the barrel or cask somewhat more deeply into the recess.

Fig. 10 shows a form in which the two shoes are not only rigid, but integral, in which case the inside arms of each may be dispensed with, the forward bar which constitutes the lip extending continuously across the front, and having at the middle, a recess or notch for the purpose above described. A modification of this device is shown in Figs. 13 to 16 inclusive, by which the loading wheels are adapted to come into peripheral engagement, at least by frictional contact, with the supporting wheels when the load comes onto the loading wheels. The advantage attained by this is that after the wheels have been introduced under the load, as seen in Fig. 12, without resorting to the pump-handle movement, it may be pushed directly under a load of considerable weight and extent, because the engagement of the wheels at their proximate sides makes them assist each other in the movement. It will be observed that this movement is not interfered with by the engagement of the pawl and ratchet devices, so that they can still be present and even left in engagement; but for the simple movement indicated, without the pump-handle movement, they may as well be left out of engagement since their action does not in any manner effect the result. The modified structure preferably has the wheels more nearly of the same size than the structure shown in the principal figures, and the details are otherwise modified and will now be described particularly. In this form, the shaft $F^{11}$ constitutes also the pivot for the shoes, as clearly seen in Fig. 13. In this form the two loading wheels are journaled on a common shaft on which they are each loose and free to revolve, the shaft $h^3$ extending through from side to side across the interval between the shoes, and obtains support in the side-bars of both the wheel-bearing brackets at the oblique slots $h^4$ $h^4$. Best seen in Fig. 12. The length and direction of these slots are such as to permit the shaft to fall to a position which will bring the loading wheels in contact with the supporting wheels, as seen in Fig. 12, when the truck is horizontal or in any position such that the pressure of the load on the wheels, or the weight of the wheels and the shaft themselves can operate by gravity in any direction toward the supporting wheels, but so that when the truck stands upright, the weight of the truck will cause the shaft to occupy the upper and forward end of the slots, and keep the loading wheels out of contact with the supporting wheels, so that all the wheels will operate as supporting wheels when the truck stands upright, and so that the loading wheels will operate as the sole supporting wheels while the truck is thrown onto them, as shown in Fig. 3, for the purpose of forcing the shoes under the load. In order to permit this shifting of position of the loading wheels and their shaft, it is only necessary to locate and proportion the hubs of the wheels and the wheels and the hubs of the pawls, so that they can clear each other in the movement described. Evidently, the wheels might be made with space enough within their ratchet peripheries to perform this movement without any modification of form; but in the principal drawings they are shown more compactly designed, and without changing them in this respect, the hubs are made to clear by the slight modification made in Fig 15, which consists in cutting away the outer end of the hub of the wheel, so that it will pass by the hub of the pawl in the described movement of the wheels. This necessitates providing a stop collar or equivalent device, $h^{40}$, on the shaft outside of the hub of each of the wheels H, the wheels having been stopped directly against the side-bars of the wheel-bearing frame in the principal form, as seen in Fig. 6. The shoes in this form have their inner side-bars each provided with a notch $g^2$ in the under edge, to admit the shaft $h^3$,—that is, to permit the shoes to swing down or forward to the position shown in Fig. 13. The shaft $h^3$ thus constitutes the stop for the shoes at this position, and in order that the strain of lifting which comes upon such stop may not be borne entirely by the inner side-bars, the shaft $h^3$ is extended through the outer bars of the wheel-bearing bracket C, projecting beyond them, and the outer side-bars of the shoes have thrown inward from the inner face of each, a boss $g^{20}$ shaped as shown by dotted lines on the shoes in Fig. 16; and this boss stops on the projecting end of the shaft $h^3$ precisely as the edge of the notch $g^2$ on the inner side-bar stops on the shaft. The notch on the inner side-bar somewhat weakens the side-bar, and this may be compensated by throwing out the boss $g^{20}$ from this side-bar also. The two shoes may be secured together in this form as in the other form by a cross-brace $g$, which is best located directly over the shaft $h^3$, as seen in Figs. 15 and 16. The rear edge of the slot $g^2$, and the corresponding edge of the boss $g^{20}$, have the incline $g^{21}$, adapted, as the shoe swings down to place, to force the shaft forward, and thereby upward in the slots $h^4$, if the mere weight of the truck has not already done so, and if even the weight of the truck and the weight of the shoes should not make the shaft take this position, the weight of the load on the shoe will do so.

The form and arrangement of the loading wheels with respect to the supporting wheels, which are shown in Figs. 13 to 16 inclusive, have another advantage not possessed by the form shown in the other figures, in that after the load has been overbalanced on the loading wheels, so that its weight is carried by them, if the truck, being let down to an approximately horizontal position, is wheeled forward on the supporting wheels, the loading wheels, rotated by their engagement with the supporting wheel, propels the load resting on them to the rear,—that is, farther up onto the truck,—and this expedient may be resorted to to relieve the operator of the necessity of pushing the load up by hand.

M is a chain for which a rod M' may be substituted (see Fig. 12), which is stretched between the two cross-bars D and D' of the frame at the middle of the truck.

N is the grapple hook or claw, which is hung on the chain and has its hooked nose adapted to engage the load when it is suitable for such engagement, as seen in Fig. 1, so that it may be kept from tipping off the truck after it has lodged upon it, even though a truck may be lifted to a position where, but for such detention, it might tip off. The peculiarity of this device is its adaptation to engage automatically between the links of the chain at its eye, by which it is hung thereon when the point of the hook is engaged with the load, so that if the load tends to tip forward or off the truck, the hook is pulled positively into engagement with the chain, as seen in Fig. 1, and by the yielding of the chain slightly out of the direct line in which it is stretched the engagement is rendered more effective. In order that the load may, notwithstanding the presence of the hook and of its engagement with the load and with the chain as shown, rest half upon the truck when the position of the truck tends to cause it to fall onto the latter, the eye of the hook extends practically its entire length, the hook being a loop, one end of which is the sharpened nose or claw. This permits the hook, when engaged with the load, to drop back between the bars of the bow B, when the load falls onto these bars, the chain occupying the long eye in the hook. As stated, a rigid rod may be substituted for the chain, but not with all the advantages above described, for in that case, in order that the hook may at its connection with the rod be adapted to grip the rod tightly when the load tilts forward, it must be made substantially as shown in Fig. 12, the hook having a solid hub, through which is an eye which fits loosely on the rod, so that it can cramp on the rod and bind the latter at its opposite edges, as seen in Fig. 12, when the load engaged with the hook pulls the latter forward.

Some details of the construction of the truck frame, adapted to give it rigidity, may now be described. As already stated, the tubular side-bars A A and the bow B, are provided with seats or sockets in the upper ends of the wheel-bearing brackets. The construction in this respect is seen in Fig. 7, these seats or sockets $C^4$ $C^4$ and $C^5$ $C^5$ being half round and overhanging the tubular arms which seat under them. The cross-bar D' is provided with suitable seats upon the upper sides of these half round sockets, and being supplemented by the bar $D^2$ on the lower side, and bolts $c^7$ inserted through the bar $D^2$, the tubular arms A A, the half round seats $C^4$ and the cross-bar D' bind the parts firmly together. The struts $a$ are made hollow, as seen in Fig. 5, and cap and conceal the lower ends of the bolts $c^7$ and the nuts thereon, as seen in that figure. The two bars D' and $D^2$ are then bound together at the middle, having been each provided with transverse grooves struck in them at the middle point, which grooves, coming together, make a socket or eye for the stem of the bolt which terminates the chain M, or for the end of the rod M' which may be substituted for the chain, and the two bars being riveted together in the opposite sides of the seat thus formed, constitute the transverse truss of the frame, as seen in Fig. 7. The ends of the bow B, lodged in the overhanging half round seats $C^5 C^5$, are bound in that position by bolts $c^5$ which pass through the bars $D^2$ and D' respectively, as seen in Fig. 7. At the upper end of the truck, the cross-bar D is similarly secured to the arms A A and the sides of the bow B, and specific description or illustration of the structure at this point is not needed, in view of the description already given of the structure shown in Fig. 7. The straining rods E E, which, at the upper end, pass through the side-bars A A and are provided with nuts at their ends above the bars at the lower end enter through the notch $a'$ in the lower ends of the side-bars A, and are riveted fast to the side-bars, and at the same time to the wheel-bearing brackets at the seats of said side-bars in the brackets, as seen in Fig. 5, $e$ representing the rivets at that point.

The handle ends of the side-bars A are preferably provided with rollers $A^5$ journaled in the metal knobs $A^6$, which terminate the handles, so that the truck needs no further support at the handle end, but may be supported at this end when in horizontal position, by the handles, and may in this position be rolled about on the floor, the rollers at the ends of the handles rendering this mode of use easy.

I claim—

1. In a truck, in combination with the principal frame and main supporting wheels journaled therein, a supplemental wheel or roller located in such position with respect to the main wheel as to be off of the ground and extend above the plane of the load-supporting surface of the truck when the latter is horizontal, the shaft or bearings of said supplemental wheel being movable with respect to the primary wheel to permit such supplemental wheel to come into peripheral contact with the primary wheel: substantially as set forth.

2. In a truck, in combination with the frame, the load-supporting wheels journaled on the frame above or forward of the truck-supporting wheels; the shoe pivotally connected to the frame and adapted to project forward of the load-supporting wheels when the truck is upright, and in tilting back toward the truck, to describe by its forward edge or point an arc outside the load-supporting wheels, and adapted to stop against the frame behind or above said load-supporting wheels, with its edge or point standing above or forward of a plane tangent to the load-supporting wheel and extending to part of the load-supporting surface of a truck; whereby such shoe may operate as a detent dog or pawl to prevent the downsliding of the load: substantially as set forth.

3. In combination with the truck frame and the load-supporting wheels journaled above or forward of the truck-supporting wheels and having their bearings or supporting shaft movable in the truck frame to permit the load-supporting wheels to come into peripheral contact with the truck-supporting wheels; a shoe pivotally connected to the frame and adapted to tilt from its forward or load-engaging position behind or above the load-supporting wheels, and stopped on the frame in such backward tilting movement with its edge or point standing above or forward of a plane tangent to the load-supporting wheels and extending to the upper part of the truck, whereby said edge of the shoe constitutes a fulcrum over which the load may be tilted to take it off the load-supporting wheels to relieve the truck supporting wheels of the friction of the latter: substantially as set forth.

4. In combination with the truck frame, the truck-supporting wheels journaled thereon; the load-supporting wheels also journaled on the frame forward of or above the truck-supporting wheels, said wheels having ratchet rims; pawls pivoted on the frame adapted to engage said rims respectively, and the spring L having two arms which operates against the pawls respectively, said pawls having a path on which the spring bears extending both sides of the fulcrum of the pawl, and a rod from said spring extending up to the handle end of the truck, whereby the springs may be adjusted to bear against the pawls at either side of their fulcrums to hold them into or out of engagement with their ratchets respectively at will: substantially as set forth.

5. In combination with the truck frame, the truck-supporting wheels journaled thereon; the load-supporting wheels also journaled on the frame forward of or above the truck-supporting wheels, said wheels having ratchet rims; pawls pivoted on the frame adapted to engage said rims respectively, and the spring L having two arms which operate against the pawls respectively adapted to be shifted at will past the fulcrums to hold them in or out of engagement with the ratchets respectively, and a rod from said spring extending up to the handle end of the truck: substantially as set forth.

6. In a truck frame, comprising the wheel-bearing brackets C C, provided with seats or sockets at their upper ends for the longitudinal bars, the handle or side-bars A A, and the bow B, having their ends lodged in such seats respectively, and the cross-bars D and D', and the supplemental bars $D^2$, and bolts extending through said cross-bars and supplemental bars at the seats of the tubular bars in the brackets: substantially as set forth.

In testimony whereof I have hereunto set my hand, at Chicago, Illinois, this 26th day of December, 1893.

HENRY O. THOMAS.

Witnesses:
JEAN ELLIOTT,
JNO. COULTER.